(12) United States Patent
Wajs et al.

(10) Patent No.: US 10,990,840 B2
(45) Date of Patent: Apr. 27, 2021

(54) CONFIGURING DATA PIPELINES WITH IMAGE UNDERSTANDING

(71) Applicants: Scenera, Inc., Palo Alto, CA (US); Sony Semiconductor Solutions Corporation, Atsugi (JP)

(72) Inventors: Andrew Augustine Wajs, Haarlem (NL); Aviram Cohen, Ge'alya (IL); Munehiro Shimomura, Yokohama (JP); Hironori Miyoshi, Hiratsuka (JP)

(73) Assignees: Scenera, Inc., Palo Alto, CA (US); Sony Semiconductor Solutions Corporation, Kanagawa (JP)

( * ) Notice: Subject to any disclaimer, the term of this patent is extended or adjusted under 35 U.S.C. 154(b) by 7 days.

(21) Appl. No.: 16/355,705

(22) Filed: Mar. 15, 2019

(65) Prior Publication Data
US 2020/0293803 A1    Sep. 17, 2020

(51) Int. Cl.
*G06K 9/00* (2006.01)
*G06F 13/40* (2006.01)
*G06K 9/62* (2006.01)

(52) U.S. Cl.
CPC ..... *G06K 9/00979* (2013.01); *G06F 13/4027* (2013.01); *G06K 9/00718* (2013.01); *G06K 9/6217* (2013.01); *G06K 2009/00738* (2013.01)

(58) Field of Classification Search
CPC ........... G06K 9/00979; G06K 9/00718; G06K 9/6217; G06F 13/4027
See application file for complete search history.

(56) References Cited

U.S. PATENT DOCUMENTS

| 4,809,346 A | 2/1989 | Shu |
| 6,031,573 A | 2/2000 | Maccormack et al. |

(Continued)

FOREIGN PATENT DOCUMENTS

WO    WO 2016/044778 A1    3/2016

OTHER PUBLICATIONS

Application Programming Interface, Wikipedia.org, Last edited Oct. 20, 2017, 9 pages, [Online] [Retrieved on Oct. 24, 2017] Retrieved from the Internet at<URL:https://en.wikipedia.org/wiki/Application programmina interface>.

(Continued)

*Primary Examiner* — Ruiping Li
(74) *Attorney, Agent, or Firm* — Fenwick & West LLP

(57) ABSTRACT

A network of nodes is organized into a data pipeline for one or more applications that require image understanding. The nodes are configurable to form different data pipelines, depending on the application. The process of configuring a data pipeline from the nodes may be standardized. In one implementation, the nodes have various capabilities, which may include sensor functions (e.g., image capture) and image understanding functions (e.g., object detection and recognition). Based on descriptions of the capabilities of the nodes, various nodes are selected for inclusion in the data pipeline and the interconnections between the selected nodes to form the data pipeline are also determined. Control data is transmitted to the selected nodes to form the data pipeline. The control data specifies the sensor and/or image understanding functions for the selected nodes according to each node's role in the data pipeline and also specifies the interconnections between the selected nodes.

20 Claims, 13 Drawing Sheets
(3 of 13 Drawing Sheet(s) Filed in Color)

(56) References Cited

U.S. PATENT DOCUMENTS

| | | |
|---|---|---|
| 6,628,339 B1 | 9/2003 | Ferland et al. |
| 8,560,785 B1 | 10/2013 | Malhotra et al. |
| 8,970,654 B1 | 3/2015 | Johnson et al. |
| 9,225,889 B1 | 12/2015 | Korkin |
| 9,588,822 B1 | 3/2017 | Shih et al. |
| 2001/0043271 A1 | 11/2001 | Kawano |
| 2003/0227392 A1 | 12/2003 | Ebert et al. |
| 2004/0048507 A1 | 3/2004 | Hage |
| 2005/0132385 A1 | 6/2005 | Bourges-Sevenier |
| 2006/0055819 A1 | 3/2006 | Pokrovsky et al. |
| 2006/0187338 A1 | 8/2006 | May et al. |
| 2007/0195182 A1 | 8/2007 | Ito |
| 2008/0074540 A1 | 3/2008 | Liu |
| 2008/0211941 A1 | 9/2008 | Deever et al. |
| 2010/0250497 A1 | 9/2010 | Redlich et al. |
| 2010/0321528 A1 | 12/2010 | Yu et al. |
| 2011/0158510 A1 | 6/2011 | Aguilar et al. |
| 2011/0199497 A1 | 8/2011 | Motta |
| 2011/0211215 A1 | 9/2011 | Yamamoto |
| 2011/0234807 A1 | 9/2011 | Jones et al. |
| 2011/0242317 A1 | 10/2011 | Wengrovitz |
| 2011/0305394 A1 | 12/2011 | Singer et al. |
| 2012/0162366 A1 | 6/2012 | Ninan et al. |
| 2012/0258658 A1 | 10/2012 | Matsuo |
| 2012/0275640 A1 | 11/2012 | Widzinski et al. |
| 2012/0294583 A1 | 11/2012 | Kosaka et al. |
| 2013/0057713 A1 | 3/2013 | Khawand |
| 2013/0272627 A1 | 10/2013 | Chen et al. |
| 2013/0308036 A1 | 11/2013 | Peng |
| 2014/0022399 A1 | 1/2014 | Rashid |
| 2014/0306010 A1 | 10/2014 | Prokop |
| 2015/0146037 A1 | 5/2015 | Keelan |
| 2015/0227797 A1 | 8/2015 | Ko et al. |
| 2015/0244943 A1 | 8/2015 | Brown |
| 2015/0334285 A1 | 11/2015 | Zhang et al. |
| 2015/0350711 A1 | 12/2015 | Guzik |
| 2016/0044227 A1 | 2/2016 | Johnson et al. |
| 2016/0056964 A1 | 2/2016 | Andiappan et al. |
| 2016/0063036 A1 | 3/2016 | Kawai |
| 2016/0112630 A1 | 4/2016 | Kanumuri et al. |
| 2016/0134932 A1 | 5/2016 | Karp et al. |
| 2017/0093852 A1 | 3/2017 | Khosravi et al. |
| 2017/0180386 A1 | 6/2017 | Dewan et al. |
| 2017/0336858 A1* | 11/2017 | Lee .................. G06F 3/005 |
| 2017/0337425 A1 | 11/2017 | Lee et al. |

OTHER PUBLICATIONS

Encryption, Wikipedia.org, Last edited Oct. 3, 2017, 5 pages, [Online] [Retrieved on Oct. 24, 2017] Retrieved from the Internet at <https://en.wikipedia.org/wiki/Encryption>.

PCT International Search Report and Written Opinion, PCT Application No. PCT/US17/32267, dated Jul. 31, 2017, 28 pages.

PCT International Search Report and Written Opinion, PCT Application No. PCT/US17/32268, dated Sep. 15, 2017, 22 pages.

PCT International Search Report and Written Opinion, PCT Application No. PCT/US17/32269, dated Sep. 14, 2017, 24 pages.

PCT International Search Report and Written Opinion, PCT Application No. PCT/US17/48383, dated Dec. 22, 2017, 18 pages.

PCT Invitation to Pay Additional Fees, PCT Application No. PCT/US17/32268, dated Jul. 18, 2017, 2 pages.

PCT Invitation to Pay Additional Fees, PCT Application No. PCT/US17/48383, dated Oct. 18, 2017, 2 pages.

PCT Invitation to Pay Additional Fees, PCT Application No. PCT/US17/32269, dated Jul. 18, 2017, 2 pages.

U.S. Appl. No. 15/469,380, filed Mar. 24, 2017, Inventors: David D. Lee et al.

Farabet, C. et al. "Learning hierarchical features for scene labeling," In: IEEE transactions on pattern analysis and machine intelligence, Oct. 15, 2012, vol. 35, No. 8, Retrieved May 10, 2020 from https://hal-upec-upem.archives-ouvertes._fr/hal-00_7_42077_/_document, 16 pages.

PCT International Search Report and Written Opinion, PCT International Patent Litigation No. PCT/US2020/022485, dated Jun. 15, 2020, 33 pages.

* cited by examiner

CONFIGURING DATA PIPELINES WITH IMAGE UNDERSTANDING

BACKGROUND

1. Technical Field

This disclosure relates generally to the processing and understanding of sensor data that includes images.

2. Description of Related Art

Millions of cameras and other sensor devices are deployed today. There generally is no mechanism to enable computing to easily interact in a meaningful way with content captured by cameras. This results in most data from cameras not being processed in real time and, at best, captured images are used for forensic purposes after an event has been known to have occurred. As a result, a large amount of data storage is wasted to store video that in the end analysis is not interesting. In addition, human monitoring is usually required to make sense of captured videos. There is limited machine assistance available to interpret or detect relevant data in images.

Another problem today is that the processing of information is highly application specific. Applications such as advanced driver assisted systems and security based on facial recognition require custom built software which reads in raw images from cameras using each camera's native low-level interface, and then processes the raw images in a specific way for the target application. The application developers typically must create specific low-level interfaces for each different type of camera just to obtain the raw images, and then they typically must also create application-specific software to process the raw video frames to extract the desired information.

In addition to the low-level camera interfaces, if application developers want to use existing processing or analysis capabilities, such as artificial intelligence or machine learning for higher-level image understanding, they will also have to understand and create interfaces for each of these systems. These systems may use proprietary APIs. An application developer may become locked into a specific vendor's solution, making it difficult to subsequently switch to other solutions.

As a result, the development of applications that make use of networks of sensors is both slow and limited. For example, surveillance cameras installed in an environment typically are used only for security purposes and in a very limited way. This is in part because the image frames that are captured by such systems are very difficult to extract meaningful data from. Similarly, in an automotive environment where there is a network of cameras mounted on a car, the image data captured from these cameras is processed in a way that is very specific to a feature of the car. For example, a forward facing camera may be used only for lane assist. There usually is no capability to enable an application to utilize the data or video for other purposes. There also usually is no flexibility to allow different applications to piece together different sensors and different processing functions into a data pipeline as needed for that particular application.

Thus, there is a need for more flexibility and ease in accessing and processing data captured by sensor devices, including higher-level understanding of images and video captured by cameras. There is also a need for more flexibility and ease in allowing multiple applications to assemble customized data pipelines from existing (and shared) sensor and processing capabilities.

SUMMARY

The present disclosure overcomes the limitations of the prior art by providing an approach for organizing a network of nodes into data pipelines for one or more applications that require image understanding. The nodes are configurable to form different data pipelines, depending on the application's needs. In some embodiments, the process of configuring a data pipeline from the nodes is performed according to a standard and/or via a standardized API.

The nodes have various capabilities, which may include access to sensor functions (e.g., image capture) and image understanding functions (e.g., object detection and recognition). Based on descriptions of the capabilities of the nodes, certain nodes are selected for inclusion in the data pipeline. The interconnections between the selected nodes to form the data pipeline are also determined. Control data is transmitted to the selected nodes, resulting in formation of the data pipeline. The control data specifies the sensor and/or image understanding functions for the selected nodes according to each node's role in the data pipeline and also specifies the interconnections between the selected nodes.

In the pipeline, some nodes have access to sensor capabilities. They may be sensors themselves or have access to sensors. The sensor functions operate as sources for the data pipeline. This includes nodes capable of image capture (i.e., cameras). The data pipeline produces image data and image understanding metadata from the sensor data captured by the sources. Examples of image data include captured images and/or enhanced images derived from the captured images. Image understanding metadata is metadata that describes image understanding of the image data, for example detection or recognition of faces or objects. The image understanding metadata also references the image data that corresponds to the image understanding. For example, it may contain thumbnails and pointers to the video frames for the recognized face or object. In some cases, the control data also specifies the image data and image understanding metadata produced by the data pipeline.

Other aspects include components, devices, systems, improvements, methods, processes, applications, computer readable mediums, and other technologies related to any of the above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1A:
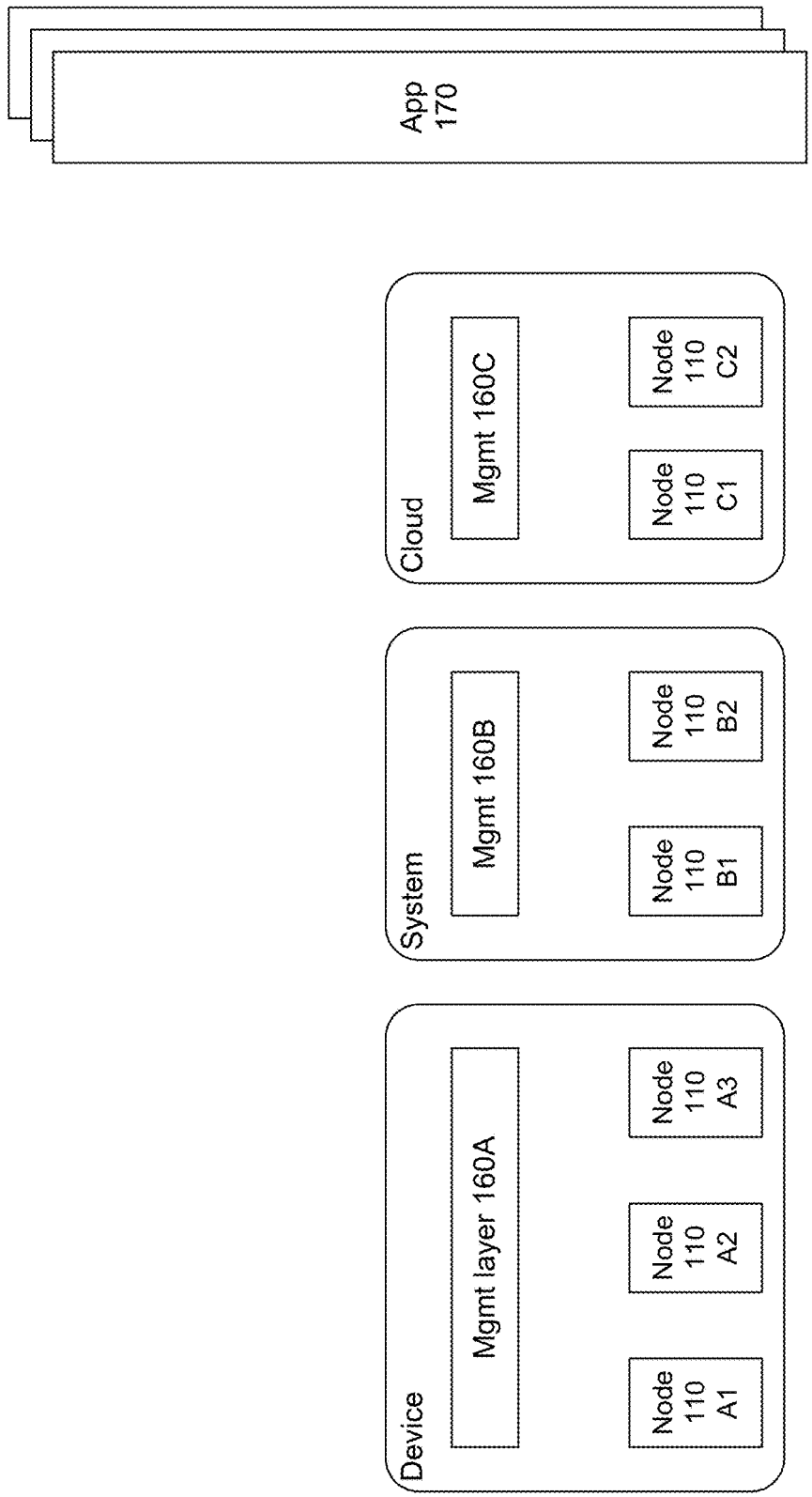
FIG. 1A is a block diagram of a network of nodes that are configurable into a data pipeline for an application.

FIG. 1A is a block diagram of a network of nodes 110 that are configurable into data pipelines for applications 170. Examples of applications 170 include smart phone applications, cloud applications and web page applications. Nodes 110 may be interconnected to other nodes within a physical device or in a separate physical device to achieve the functionality desired by the application 170.

Figure 1B:
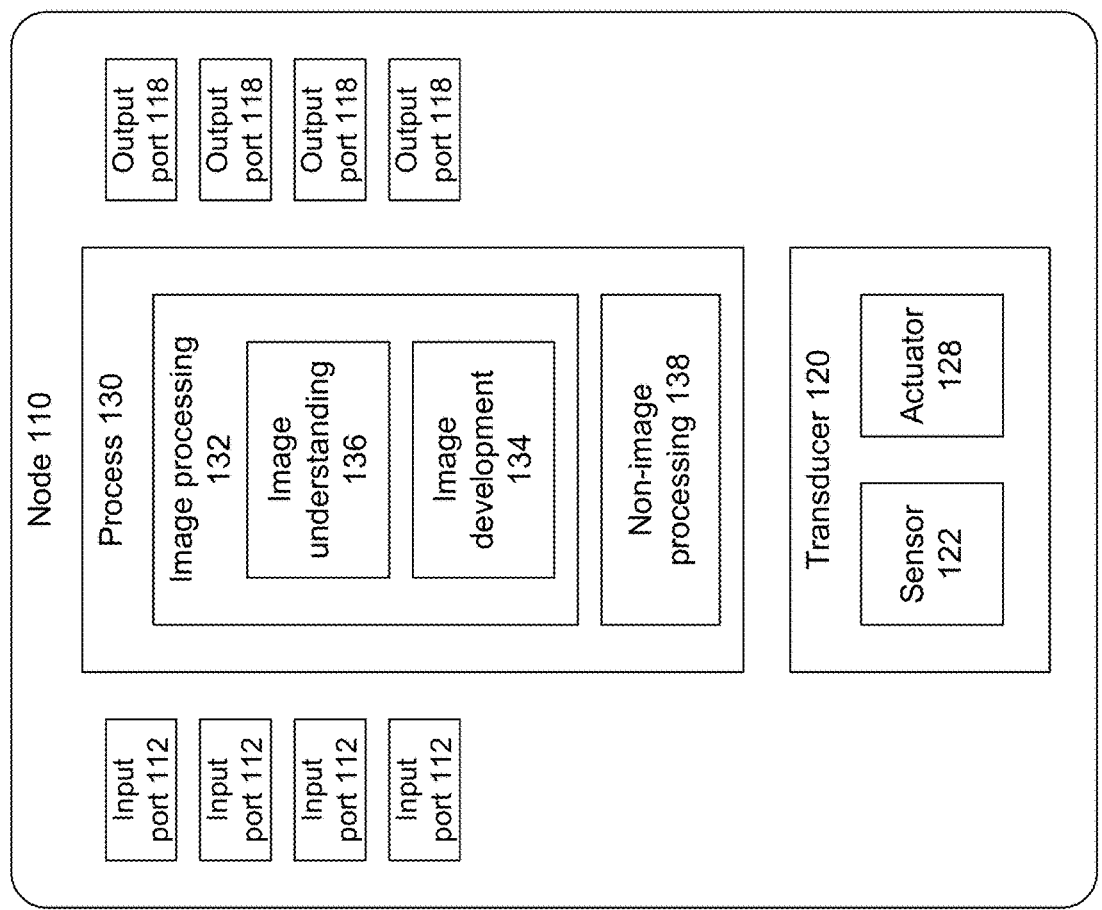
FIG. 1B is a block diagram of a node.

FIG. 1B is a block diagram of an example node 110. The node 110 has one or more ports, which may be input ports 112 or output ports 118. It also has transducer capabilities 120 and/or processing capabilities 130. FIG. 1B is a generic block diagram of a node. Actual nodes may not have all of the functions shown.

Transducers 120 can broadly be subdivided into sensors 122 and actuators 128. Sensors 122 translate external stimuli into data. Examples include image and other spectral sensors, microphones, temperature or heat sensors, pressure sensors, and smoke and other chemical sensors. Actuators 128 translate data into external stimuli. Examples include speakers and tactile feedback.

In the examples below, the transducer capabilities are shown inside the node 110 for convenience. In cases where the node 110 contains the physical transducer, the node will have direct access to the transducer functions. However, the node 110 may also have access to transducer functions for transducers located outside the node. For example, a legacy camera may not be compatible with a standard implementing the concepts described below. In that case, a bridge may serve as the node 110 with access to the camera's capability. This also applies to the processing functions 130.

Processing 130 can broadly be subdivided into image processing 132 and non-image processing 138. Image processing 132 can be further subdivided into image development 134 and image understanding 136. Image development 134 are lower level functions used to improve the quality of images. Examples include correction of sensor bias, correction of pixel defects, vignetting compensation, dark frame subtraction, white balancing, demosaicing, noise reduction, spatial filtering, color space conversion, tone mapping, gamma correction, contrast enhancement, edge enhancement, aberration correction, focus adjustment, exposure adjustment, resampling, resolution enhancement, high-dynamic range adjustment, and color filter array interpolation.

Image understanding 136 are higher level functions used to understand the content of images. One example is the detection of the presence or absence of a specific object: the detection of faces, of humans, of animals or certain types of animals, of vehicles, of weapons, of man-made structures or certain type of structures, or of texts or logos or bar codes. A higher level example is the identification (i.e., recognition) of specific objects: the identification of a terrorist in a crowd, the identification of individuals by name, the identification of logos by company, the identification of an individual against a passport or driver's license or other credential. An even higher level example of image understanding 136 are further characterizations based on the detection or identification of specific objects. For example, a face may be detected and then analyzed to understand the emotion expressed. Other examples of image understanding include the detection and identification of specific actions or activities, and of specific locations or environments.

Returning to FIG. 1A, the nodes 110 may be implemented on many different platforms, for example embedded within a camera, executed on the cloud or as a mobile application. A device may contain one node or multiple nodes. The device is responsible for configuring its nodes. A device may be a physical device or may be virtualized on a server or in the cloud. Each node is uniquely identifiable.

In FIG. 1A, different groups of nodes 110A-C are managed by a corresponding management layer 160A-C, although this is not required. In this example, management layer 160A manages nodes 110A1-3 in group A, management layer 160B manages nodes 110B1-2 in group B, and management layer 160C manages nodes 110C1-2 in group C.

The groupings could be by device or otherwise. For example, group A might contain all of the nodes 110 within a camera: individual sensors, on-device image processing and application processor for example. Group B might contain a pool of nodes 110 that are locally accessible, such as different functionalities distributed throughout a system of devices that are networked together. More complex forms of image understanding may be based on machine learning, deep learning and/or artificial intelligence techniques that require significant computing resources. For example, group C might contain higher level functions that are available as cloud services.

The application 170 organizes the nodes 110 into a data pipeline. The data pipeline includes image capture as a source of data. It also performs image understanding of the captured image data and produces metadata that describes the image understanding. For clarity, this will be referred to as image understanding metadata to distinguish from other types of metadata. For example, image understanding metadata might state whether humans are present, or provide the name of an identified human, or list the emotion identified from a face. Typically, the data pipeline will also produce image data (either the captured images or versions derived from the captured images) and the image understanding metadata will also reference the image data that corresponds to the image understanding. For example, image understanding metadata that identifies an emotion may also reference the image frame(s) for the corresponding face.

The application 170 could assemble the data pipeline directly, with the assistance of other entities, or indirectly through other entities (such as the management layers). Because the nodes 110 may be organized and then reorganized multiple times into different data pipelines, the approach described herein provides flexibility to make better use of the capabilities of the nodes. In some embodiments, the process for organizing nodes into data pipelines is based on a standard, such as a standardized API (application programming interface). Multiple applications 170 may then access the nodes to build different data pipelines and may run their pipelines simultaneously if the nodes have sufficient capacity.

Figure 2:
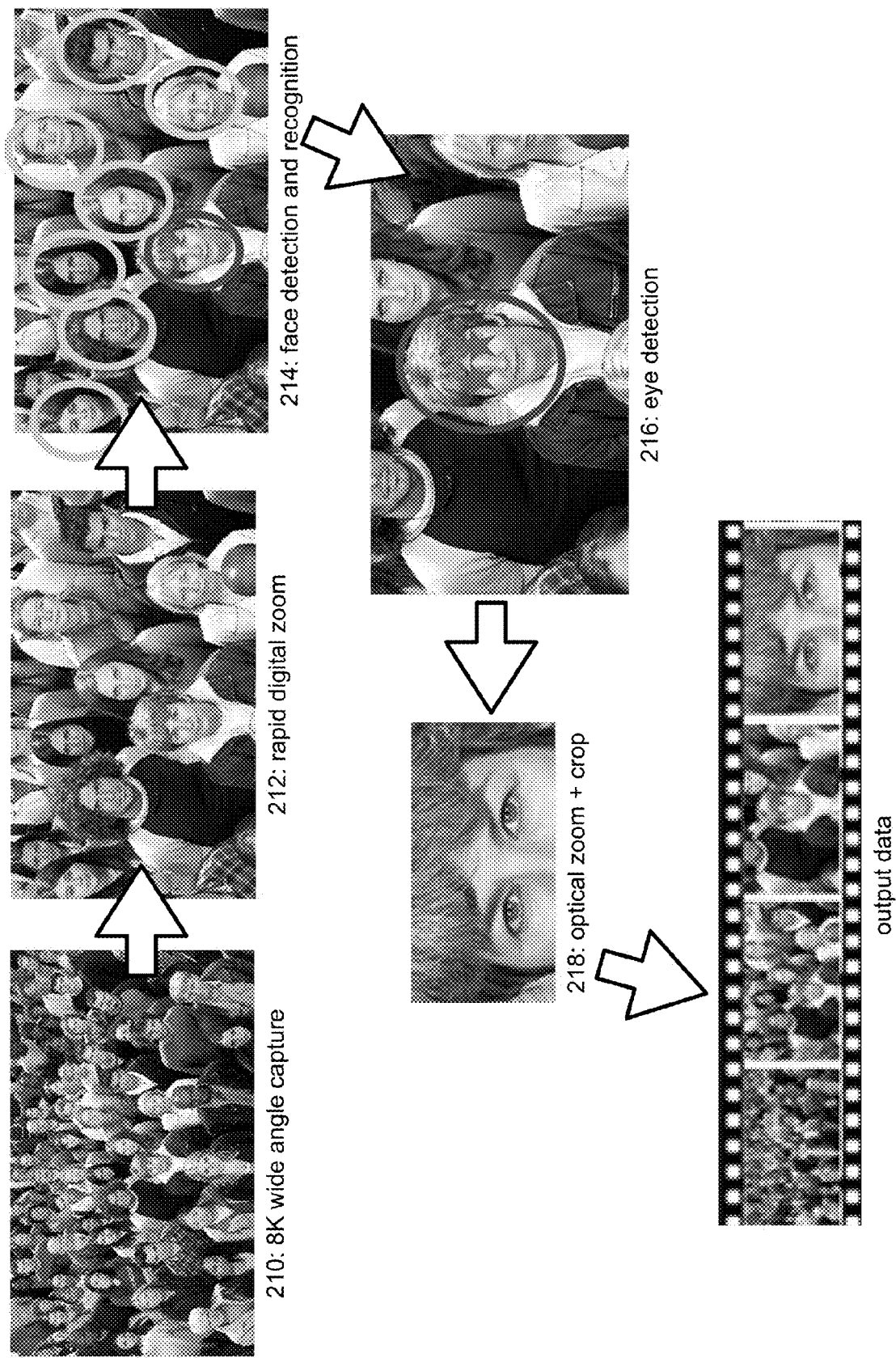
FIGS. 2-4 illustrate examples of data pipelines with image understanding.
Figure 3:
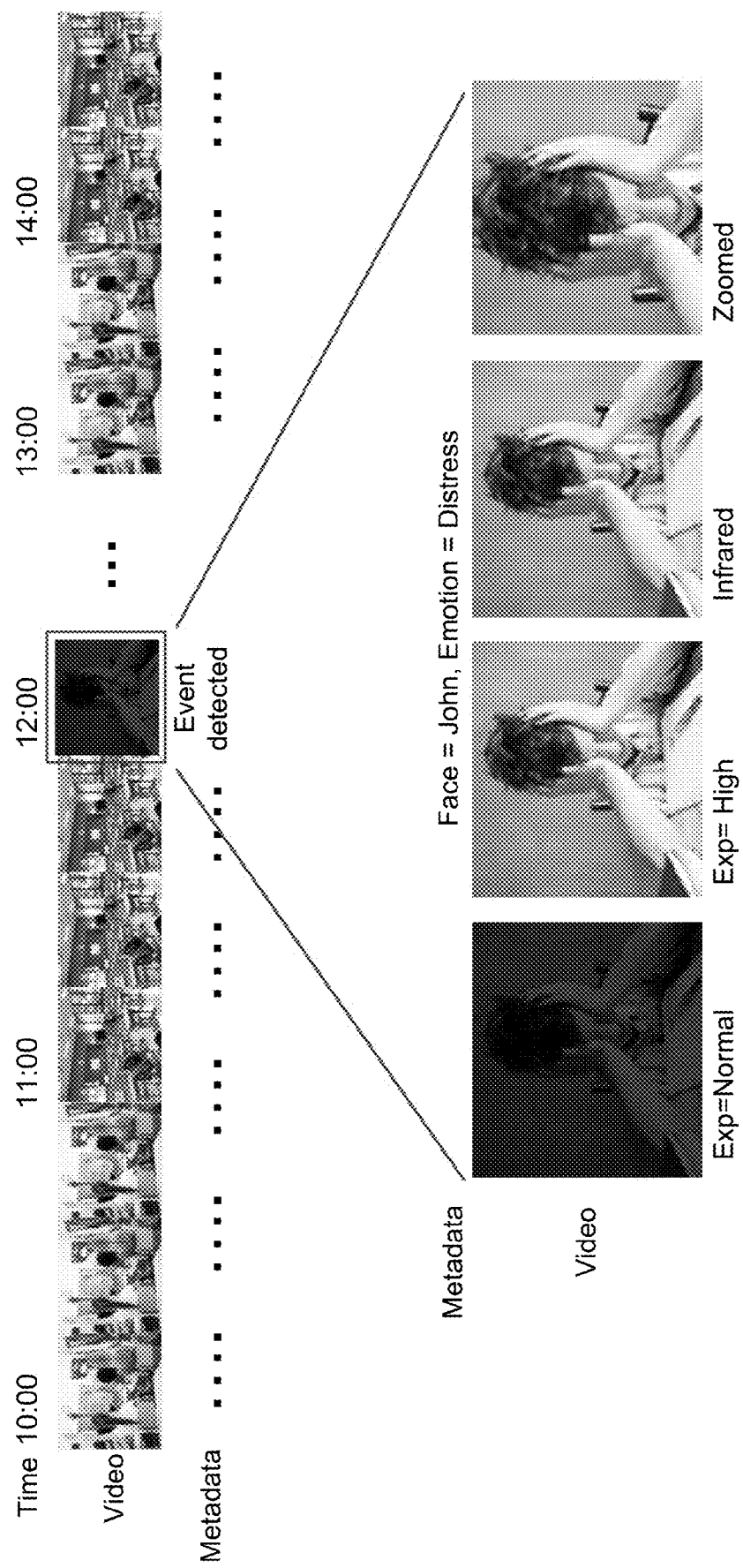
Figure 4:
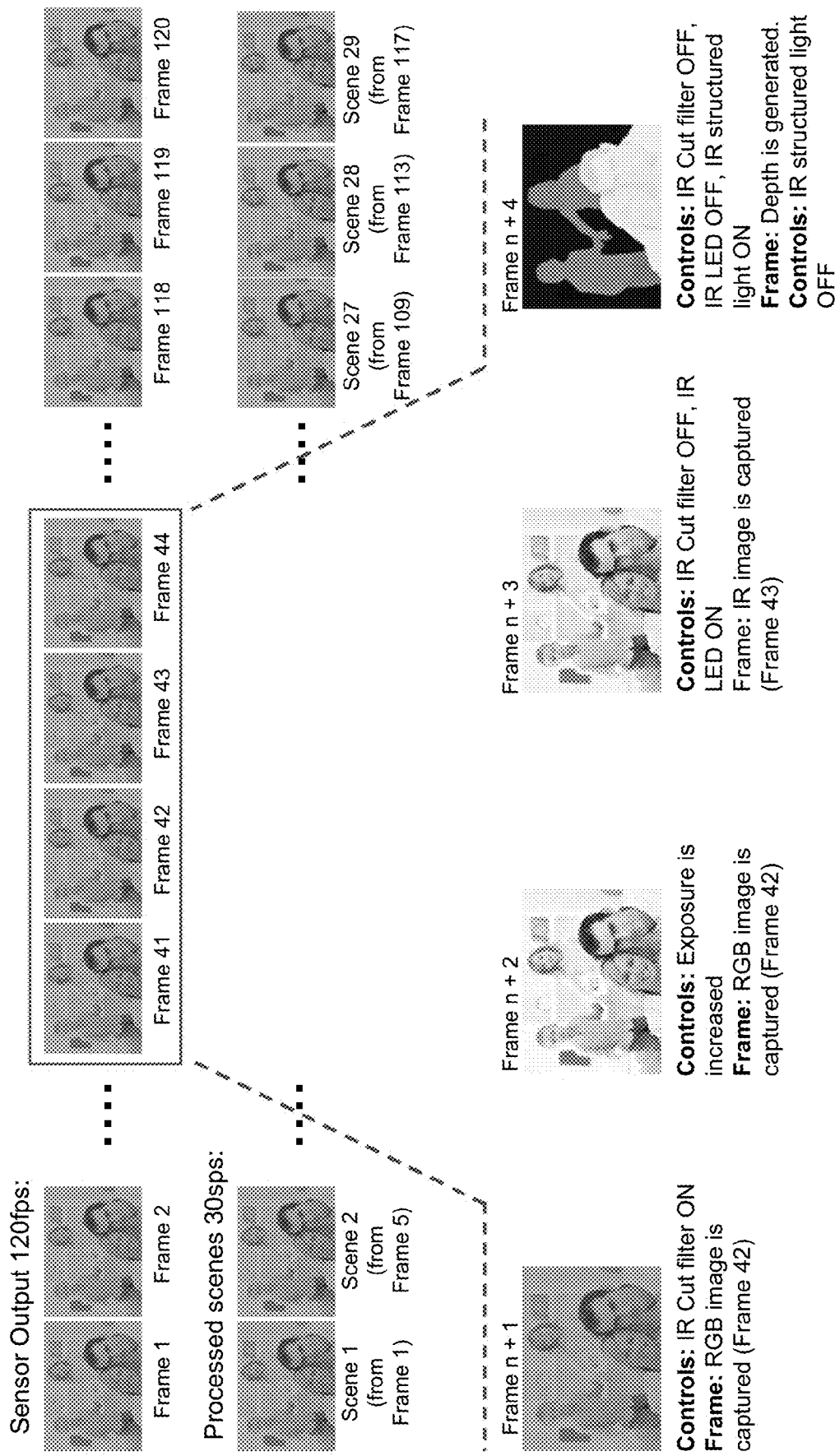

FIGS. 2-4 are examples of data pipelines with image understanding. In FIG. 2, an application is performing iris scans of people in a crowd. The data pipeline begins by capturing a low resolution color image 210 with a large field of view. The next stage in the pipeline uses a rapid digital zoom to magnify 212 a region of interest. This is followed by face detection and recognition 214 (image understanding) to identify the subject of interest. Then the locations of the eyes are determined 216. High magnification cameras are directed 218 to the eye locations, using optical zoom and digital cropping. These images can then be used for biometric iris identification. The bottom of FIG. 2 shows the image data produced by the data pipeline. Metadata for this pipeline might include identification of the subject, for example.

In the example of FIG. 3, an application provides surveillance of a school. In this example, the data pipeline begins with stages that provide general video surveillance of classrooms. This stage is tailored for general surveillance of a large area. During this stage, at 12:00, there is an event of sound recognition that identifies a person crying. This automatically marks the image frames at time 12:00.

The event triggers pipeline stages to capture more data and/or provide more processing, as shown in the lower four frames of FIG. 3. Here, the normal video is too dark, so high exposure frames are also captured. The data pipeline also captures infrared frames and zooms in for close-up frames. From these different images, additional stages in the data pipeline identify the student as John and identify he is in a distressed emotional state. This image understanding is output by the data pipeline as metadata Face=John and Emotion=Distress, as shown in FIG. 3. This metadata is for the set of four image frames, rather than for any specific one frame. The metadata also references the corresponding image frames.

FIG. 4 illustrates an example where a fast frame rate allows multiple frames to be combined for analysis by the data pipeline. In this example, the raw frame rate for the sensor device is 120 frames per second. Under normal operation, every fourth frame is captured and stored as image data. However, in the data pipeline, upon certain triggers, additional frames are captured under different conditions. In this example, the camera is a 3-color camera, but which can be filtered to effectively capture an IR image. Upon motion detection, additional images are captured: an increased exposure image, an infrared image, and a frame with depth measurement (based on infrared structured light in this example). The data pipeline processes these images in later stages to detect faces or objects or to perform other types of image understanding.

Figure 5:
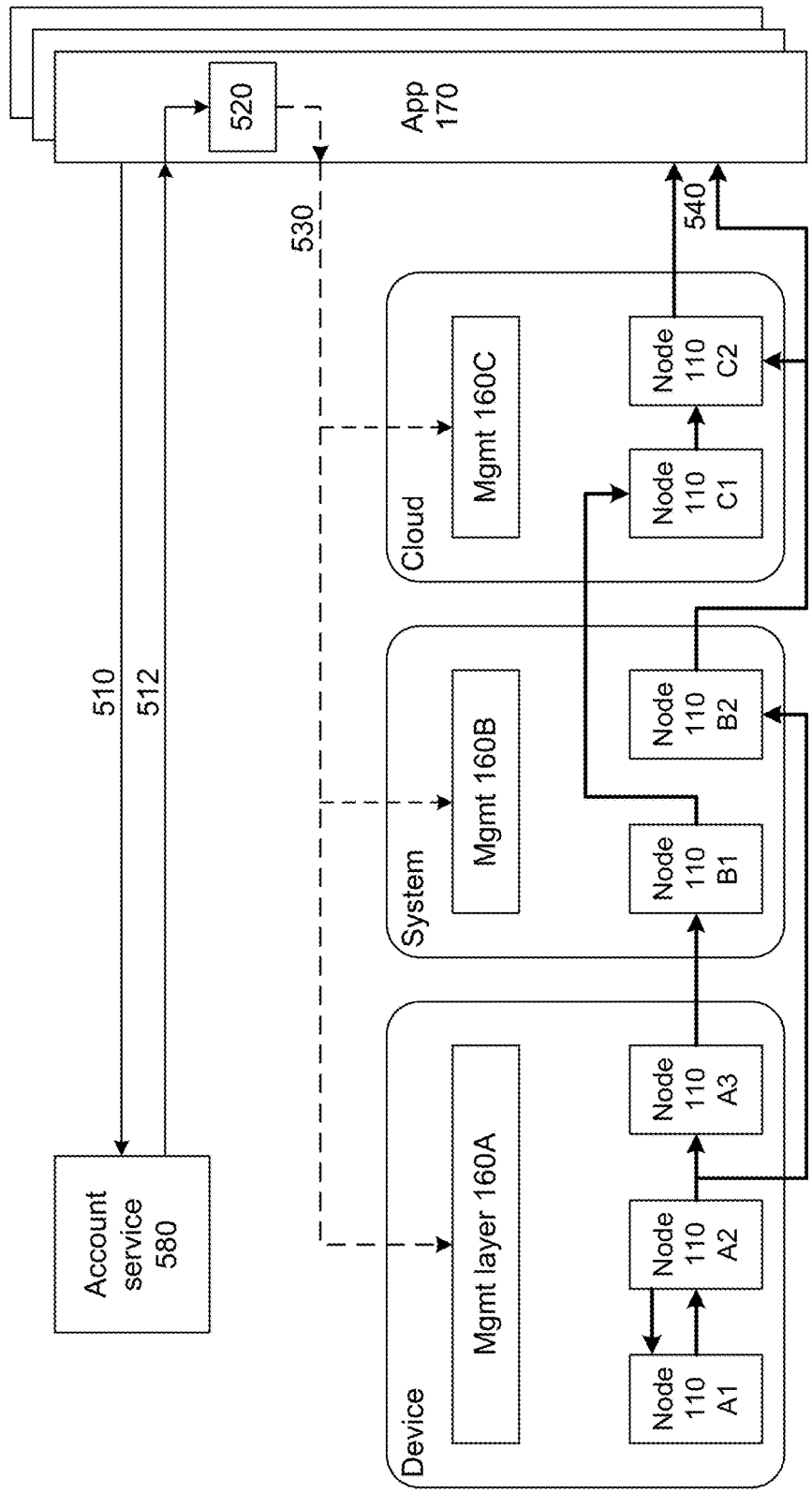
FIG. 5 is a block diagram illustrating configuration of the nodes of FIG. 1 into a data pipeline.

FIG. 5 is a block diagram illustrating configuration of the nodes of FIG. 1 into a data pipeline. This example includes an account service 580, which maintains a listing of nodes and their capabilities, and also grants to applications access to the nodes. The account services 580 can provide a way for end users to manage cameras and other sensor devices, as well as higher level processing.

In one approach, the user assigns devices/nodes to which they have access to their user account and then link applications 170 that they select to their account. Once the application 170 has been granted access to the user's account, the application 170 may request 510 a list of devices associated with the user's account and their capabilities. The account service 580 returns 512 this information and may also return passwords, keys or other credentials required to gain access to the nodes. Typically, this will be an access token. If an account service 580 is not used, the applications 170 may directly determine the available nodes and their capabilities, for example through an automatic discovery process as specified in a standard. Alternatively, this information may be provided in a separate file.

Based on the descriptions of the capabilities of the nodes, the application 170 determines 520 the data pipeline. It selects which nodes to include in the data pipeline and determines interconnections between the selected nodes to form the data pipeline. The data pipeline will include sensor nodes that serve as sources of data for the rest of the pipeline and will also include nodes with image understanding capability. Determination of the data pipeline may be based on additional information other than just the description of the capabilities of the nodes. For example, the geographic coverage or proximity of sensors to each other may be used to determine which sensors to include in the pipeline and how to interconnect them.

The application 170 transmits 530 control data to the nodes 110 selected to form the data pipeline. In FIG. 5, the control data is transmitted 530 to the management layers 160 (i.e., indirectly to the nodes), which then carry out the requested configuration. The control data specifies the functionality for each node and also specifies the interconnections between nodes. It may also specify the image data and metadata to be produced by the data pipeline. In one approach, the data pipeline is formed by each node (the sink node) establishing a control session with the immediately upstream node that supplies it with data (the source node), although other control approaches could also be used. In FIG. 5, the control plane is shown by dashed lines and the data pipeline is shown by heavy solid lines.

The example data pipeline in FIG. 5 is not linear. It has branches. Node 110A1 is the source for the entire data pipeline. The forward data path is first from node 110A1 to node 110A2. It then branches to nodes 110A3 and 110B2. The 110A3 branch continues to 110B1, 110C1, 110C2 and then 540 to the application 170. In the other branch, the output of node 110B2 is provided 540 to the application 170. It also feeds 110C2, where it is combined with the 110A3 branch. Thus there are two data feeds 540 to the application 170: one from node 110B2 and one from node 110C2.

The branching in the data pipeline could be static, as described above where data from node 110A2 always flows to both branches. It could also be triggered by conditions on the image understanding. For example, if node 110A2 performs some image understanding, the data pipeline may continue to either 110A3 or to 110B2 depending on the results of the image understanding. For example, if no weapon is detected then certain processing occurs, but if a deadly weapon is detected then other processing takes place. The triggers may be specified in the control data.

The example data pipeline in FIG. 5 also includes a feedback loop from node 110A2 to node 110A1, which is feedback between two nodes in the same group (e.g., on the same device). This particular loop provides feedback to the source node 110A1. For example, image capture settings may be changed depending on the image understanding. Feedback loops may also be established between other nodes, for example between nodes on different devices.

FIG. 5 is just one example. Other examples and topologies will be apparent. For example, the data pipeline may include multiple sources that capture different types of sensor data, with the data pipeline also containing image understanding functions based on sensor fusion. In addition, multiple applications 170, from the same or different users, could access the same nodes to construct their own data pipelines.

Figure 6A:
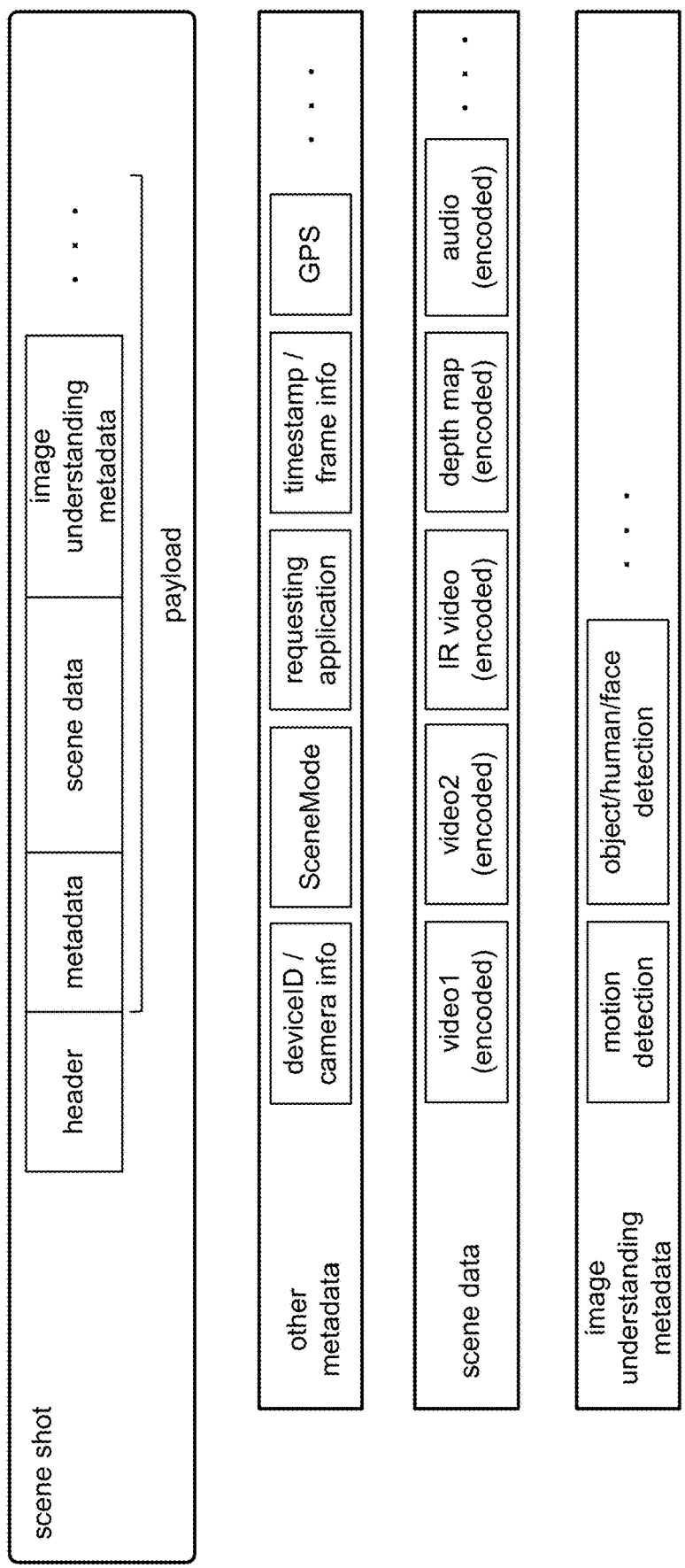
FIGS. 6A-6B illustrate output data produced by a data pipeline.
Figure 6B:
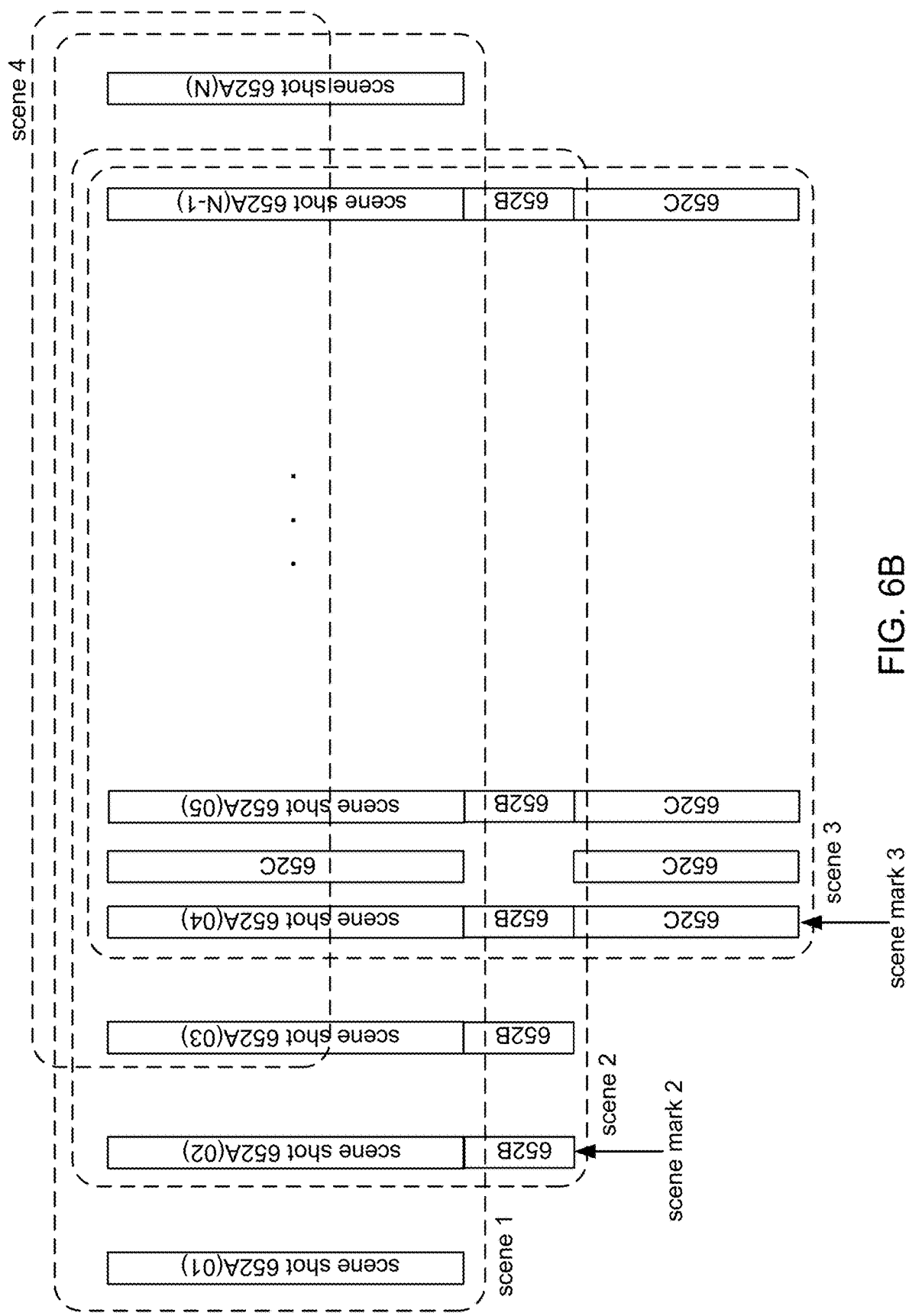

FIGS. 6A-6B provide examples of data produced by a data pipeline. In these examples, image data and other raw or enhanced sensor data is referred to as "scene data." The data is organized by time into "scene shots." If a snapshot is one frame of a series of video images, then a scene shot is the analogous concept but not limited to single frames or to just images. Scene shots typically also include metadata, which in FIG. 6A are divided into image understanding metadata and other types of metadata.

FIG. 6A is a block diagram of a scene shot. This scene shot includes a header. It includes the following general metadata: sensor device IDs, SceneMode (which is a type of control data described below), ID for the requesting application, timestamp, GPS location stamp.

The data portion of the scene shot also includes scene data, which may include color video from two cameras, IR video at a different resolution and frame rate, depth measurements, and audio. Within the video context, examples of scene data include monochrome, color, infrared, and images captured at different resolutions and frame rates. Non-image types of scene data include audio, temperature, ambient lighting or luminosity and other types of data about the ambient environment. The scene data may be encoded and/or encrypted. They may also be enhanced by image development functions, such as correction of sensor bias, dark frame subtraction, white balancing, demosaicing, noise reduction, spatial filtering, contrast enhancement, edge enhancement, etc.

The scene shot also includes image understanding metadata: motion detection and object/human/face detections, for example. These may take the form of SceneMarks, as described in greater detail below.

This data also has a temporal aspect. In conventional video, a new image is captured at regular intervals according to the frame rate of the video. Each image in the video sequence is referred to as a frame. Similarly, a scene typically has a certain time duration (although some scenes can go on indefinitely) and different "samples" of the scene are captured/produced over time. To avoid confusion, these samples of a scene will be referred to as scene shots rather than frames, because a scene shot may include one or more frames of video. The term scene shot is a combination of scene and snapshot.

Compared to conventional video, scene shots can also have more variability. Scene shots may or may not be produced at regular time intervals. Even if produced at regular time intervals, the time interval may change as the scene progresses. For example, if something interesting is detected in a scene, then the frequency of scene shots may be increased. A sequence of scene shots for the same application also may or may not contain the same types of data or data derived from the same sensor channels in every scene shot. For example, high resolution zoomed images of certain parts of a scene may be desirable or additional sensor channels may be added or removed as a scene progresses. As a final example, scene shots or components within scene shots may be shared between different applications, as well as more broadly.

In practice, the actual scene data may be quite bulky. As a result, this data may be stored by middleware or on the cloud, and the actual data packets of a scene shot may include pointers to the scene data rather than the actual data itself. As another example, metadata may be dynamic (i.e., included and variable with each scene shot). However, if the metadata does not change frequently, it may be transmitted separately from the individual scene shots or as a separate channel.

FIG. 6B is a timeline illustrating the organization of scene shots into "scenes." In this figure, time progresses from left to right. The original scene 1 is for an application that performs after-hours surveillance of a school. Scene shots 652A are captured/produced for this scene 1. Scene shots 652A may include coarse resolution, relative low frame rate video of the main entry points to the school. Scene shots 652A may also include motion detection or other processed data that may indicative of potentially suspicious activity. In FIG. 6B, the scene shots are denoted by the numbers in parenthesis (N), so 652A(O1) is one scene shot, 652A(02) is the next scene shot and so on.

Possibly suspicious activity is detected in scene shot 652A(01), which is marked by scene mark 2 and a second scene 2 is spawned. Scene mark 2 includes the image understanding metadata indicating motion was detected. This scene 2 is a sub-scene to scene 1. Note that the "sub-" refers to the spawning relationship and does not imply that scene 2 is a subset of scene 1, in terms of data or in temporal duration. In fact, this scene 2 requests additional data 652B. Perhaps this additional data is face recognition. Individuals detected on the site are not recognized as authorized, and this spawns scene 3 (i.e., sub-sub-scene 3) marked by scene mark 3. Scene 3 does not use data 652B, but it does use additional data 652C, for example higher resolution images from cameras located throughout the site and not just at the entry points. The rate of image capture is also increased. Scene mark 3 triggers a notification to authorities to investigate the situation.

In the meantime, another unrelated application creates scene 4. Perhaps this application is used for remote monitoring of school infrastructure for early detection of failures or for preventative maintenance. It also makes use of some of the same data 652A, but by a different application for a different purpose.

Figure 7:
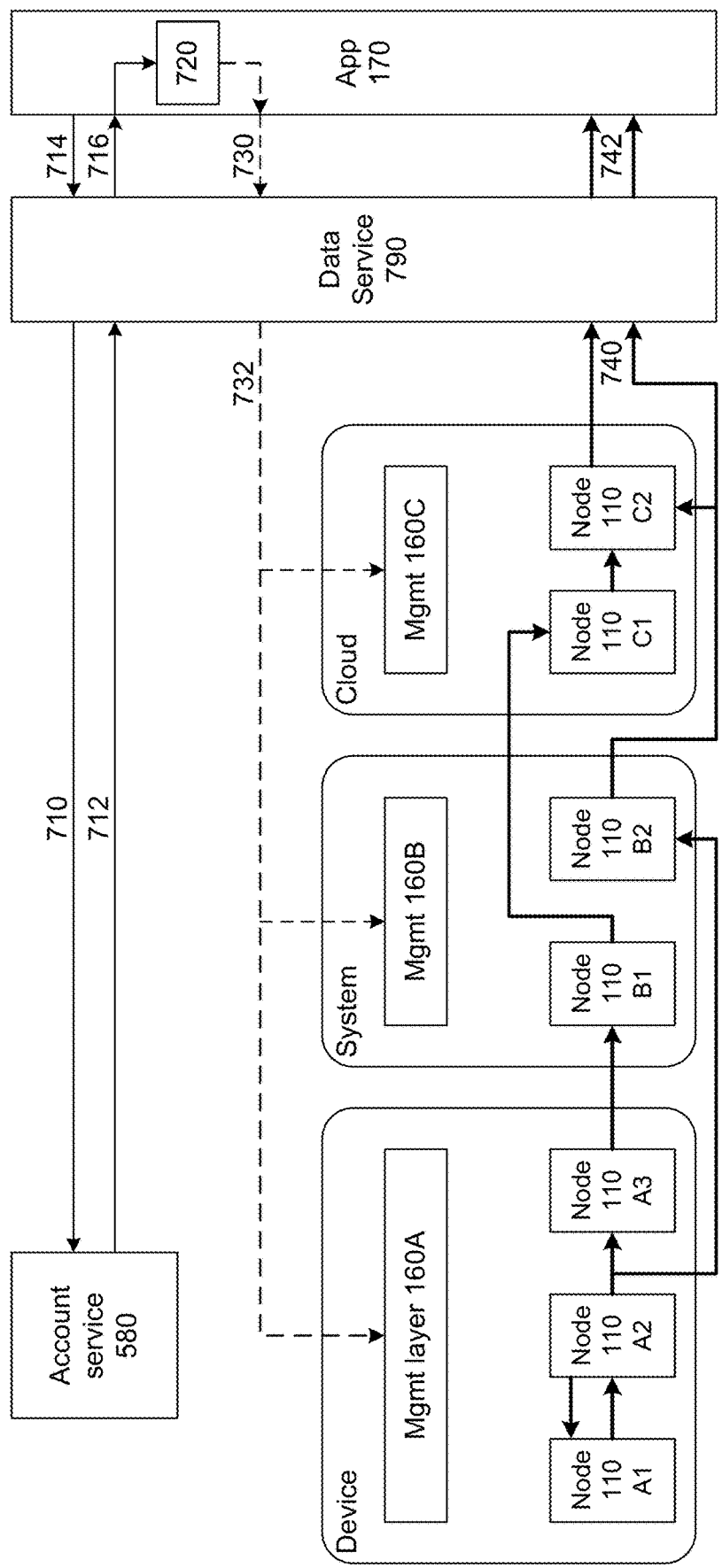
FIG. 7 is a block diagram illustrating use of an intermediary service.

FIG. 7 is a block diagram illustrating use of an intermediary service to configure the data pipeline. FIG. 7 is similar to FIG. 5, except that an intermediary service 790 is introduced. The applications 170 do not interact directly with the account service 580 or management layers 160. Rather, the applications 170 interacts with the intermediary 790, which interacts with the account service 580 and management layers 160. For example, the data service 790 may provide an API to the applications 170 to provide services to the applications.

In FIG. 7, the system operates as follows. The data service 790 maintains a listing of nodes and their capabilities. It may periodically request 710 a list of devices, nodes and their capabilities. The account service 580 returns 712 this information and may also return passwords, keys or other credentials required to gain access to the nodes. The application 170 then requests 714 and receives 716 this information from the data service 790.

Based on the descriptions of the capabilities of the nodes, the application 170 determines 720 the data pipeline. It selects which nodes to include in the data pipeline and determines interconnections between the selected nodes to form the data pipeline. The application 170 then transmits 730 control data to the data service 790, which transmits 732 corresponding control data to the management layers 160 (i.e., indirectly to the nodes), which then carry out the requested configuration. The control data specifies the functionality for each node and also specifies the interconnections between nodes. It may also specify the image data and metadata to be produced by the data pipeline.

The resulting data pipeline returns data 740 to the data service 790, which provides it 742 to the requesting application 170. Different data pipelines may be configured, as described with respect to FIG. 5.

In the example above, the intermediary service 790 was described as a pass-through entity lying between the applications 170 and the rest of the system. However, the data service 790 can also provide additional functionality. For example, the data service 790 may itself have transducer or processing functions. It may also perform cross analysis of data from multiple nodes 110 or for multiple applications 170. The data service 790 may also aggregate, prioritize or multiplex requests for data from multiple applications 170. A device may be limited to interacting with a single application 170 at a time. In that case, however, multiple applications 170 can interact with a data service 790, which then interacts with the device.

The data service 790 may also provide additional services, for example providing additional information about the devices and nodes such as a proximity map or additional information about how devices interact with each other. The data service 790 also abstracts the nodes 110 away from the individual devices. An application 170 interacting with the nodes 110 does not have to set up a control session with each device to configure each node. Rather, the application 170 requests the data service 790 to configure nodes 110, and the data service 790 takes care of creating the control session with each node 110. The intermediary does not have to be a data service. It could be a middleware layer, for example.

Figure 8:
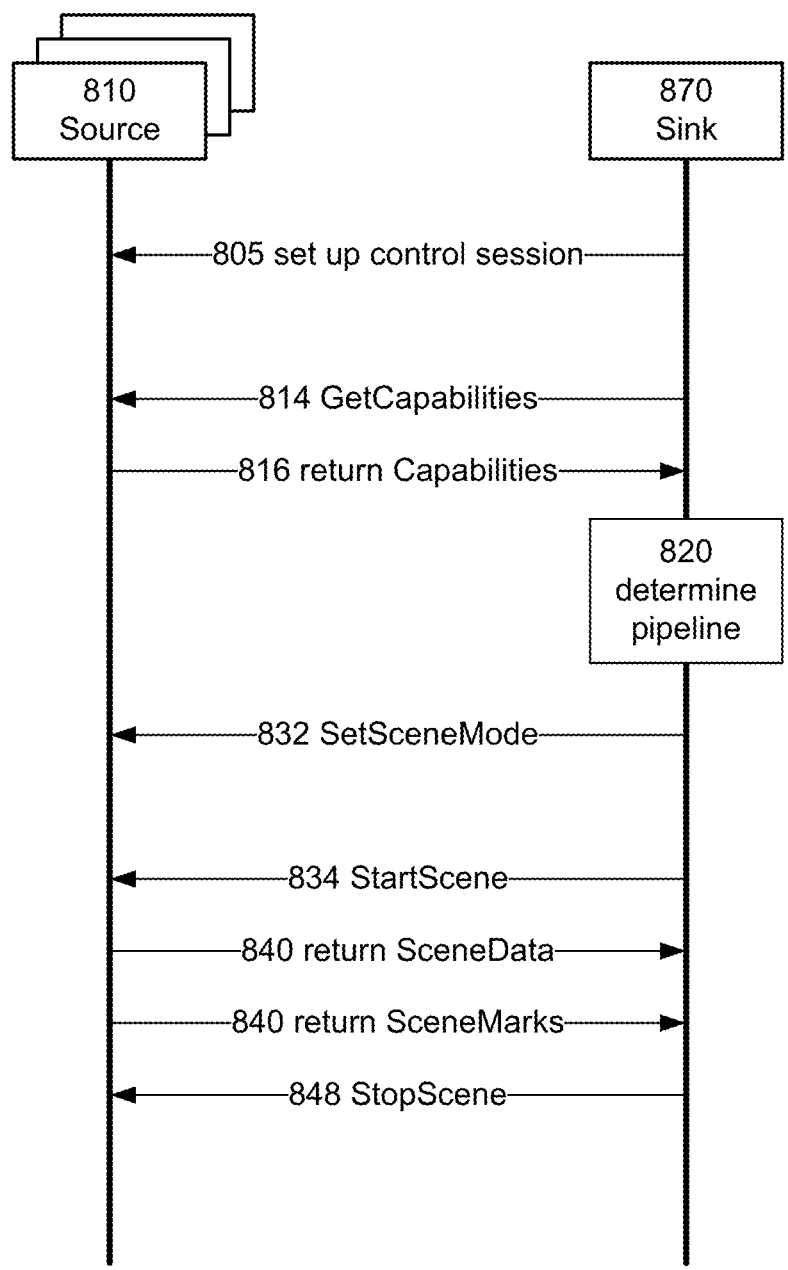
FIG. 8 is an event trace of a standards-based configuration of a data pipeline.

In some implementations, the process for configuring a data pipeline is defined in a standard or through the use of a standardized API. FIGS. 8-11 provide one example of a standard. In this example, capitalized terms, such as Sink, Source, Capabilities, SceneData, SceneMark and SceneMode, are defined in the standard. FIG. 8 is an event trace of a standards-based configuration of a data pipeline. In this example and comparing to FIGS. 1-7, the Sink 870 is the Node corresponding to the requesting application 170 and the Sources 810 are the Nodes corresponding to nodes 110. Capabilities describe the Nodes' capabilities, using the syntax of the standard. SceneModes are the control data in FIG. 5 used to configure the Nodes. SceneData and SceneMarks are the data returned by the data pipeline. SceneData contains image data and other sensor data. SceneMarks contain image understanding metadata, with references to the relevant SceneData. This data is organized into Scenes, and samples of Scenes are referred to as SceneShots.

In more detail, this example uses the following data objects which are defined by the standard:
Nodes are building blocks for the Data Pipeline. Each Node has a unique ID.
Capabilities are what a Source Node is capable of providing, such as AI algorithm, supported SceneModes, hardware sensor capabilities, etc.
SceneMode is a configuration for a Node. As applicable, the SceneMode defines the capture process for sensors, the computer vision or artificial intelligence algorithms used to process data, the data output format, etc.
SceneMark is a structured output produced by a Node which describes an event. It includes an identifier of the Node, timestamp of when the SceneMark was triggered and the results of the Node processing that triggered the event. It also contains references to SceneData that are associated with the event.
SceneData is the actual data associated with an event that has triggered a SceneMark. It may be a still image, a video clip, a temperature or other sensor's data. The data can starts a few seconds before the event and runs for a few seconds after the event depending on the requested SceneMode.

The Capabilities object is used to establish the capabilities of Nodes and the SceneMode object is used to define the configuration of each Node and the interconnection between Nodes. The SceneMark and SceneData objects are representations of the data that is processed by the Data Pipeline.

The Data Pipeline produces SceneMark and SceneData objects that are ultimately consumed by the application. SceneMark objects may be manipulated by different Nodes in the Data Pipeline. This will typically entail adding additional fields to the SceneMark object that are the result of the Nodes processing either the SceneMark or SceneData from previous Nodes. Nodes may also further generate SceneData that is the result of processing previous SceneMarks and SceneData. For example, a Node that is capable of detecting faces may process a video frame from SceneData generated by a previous Node and extract the rectangles from the frame which correspond to the faces that have been detected.

The configuration of the Data Pipeline utilizes the Capabilities object to determine the capabilities of Nodes. The Capabilities object describes whether the Node contains transducer(s), the Node's processing capabilities including which SceneModes are supported, the levels of analysis that can be performed by processes in the Node, and the port options for either inputting or outputting of data from the Node. Using this information, a SceneMode for the Node is defined, including what data flows into and out of the Node as well as whether the Node captures new sensor data and/or processes data incoming from other Nodes.

Once the SceneModes for each Node have been provided to each Node, the Data Pipeline is constructed and will begin to produce a sequence of SceneModes and SceneData in accordance with the SceneModes provided to each Node. More detailed definitions of these data objects for this example standard are provided in Section A below.

Referring to FIG. 8, the Data Pipeline is set up as follows. The Sink 870 sets up 805 a control session with the Sources 810. In one approach, the configuration of the control session occurs through an account service, which provides an access token or credential to the Sink 870. The Sink 870 uses the access token to communicate with the Source 810. The Sink determines the capabilities of each Source by making a GetCapabilities request 814 to each Source. The Sources return 816 their Capabilities. The Sink defines 820 the Data Pipeline of processes by determining the transducer and processing functions/configuration for each Node in the pipeline and determining the interconnections between Nodes.

The Sink issues 832 the corresponding SetSceneMode command. The SceneMode data object specifies the sensor and/or image understanding functions for the Node. This configuration also triggers each Node to create the interconnections with other Nodes in the Data Pipeline. The Sink triggers 834 each Node individually to start the Scene Mode using the StartScene command. The Data Pipeline then produces data using the SceneMarks and SceneData formats defined in the standard. The Sink consumes 840 the SceneMarks and SceneData generated by the Nodes. The Data Pipeline operates until the Sink issues 848 the StopScene command.

In more detail, in one approach, Nodes are uniquely identifiable by a Node ID. The Node ID is based on the Device ID for the device hosting the Node and in the case of a device which hosts more than one Node, the Node is provided with a further Node Number which when combined with the Device ID defines a unique Node ID for the Node. Similarly for the Input and Output Ports associated with a Node, each Port has a unique Port Number within the scope of the Node. The combination of the Device ID, Node Number and the Port Number defines a unique Port ID.

The Nodes generally have two interfaces: a Control Interface and a Data Interface. The Control Interface is used to configure a Data Pipeline that makes use of Nodes, including functions such as determining the Nodes' Capabilities and distributing the SceneMode to the Nodes within the Data Pipeline. In one implementation, Source Nodes are restricted to accepting only one control session at a time, meaning that any Node can be controlled by only one other Node. However, a Sink Node may establish multiple control sessions in parallel, controlling multiple Source Nodes. Some Nodes may function as both Source and Sink relative to different Nodes.

Nodes process and distribute SceneMarks and SceneData using the Data Interface. These are processed according to the sequence of Nodes and their configuration defined in the SceneMode. The Data Interface of the Nodes enables the Nodes to exchange data between them.

Returning to FIG. 8, the Sink Node sends a SetSceneMode command 832 to the Source Node using the Node ID. The SetSceneMode determines:
which data is to be prioritized—for example faces are prioritized for SceneMode=Face.
the triggers that result in a SceneMark being generated.
the type and amount of SceneData generated when a trigger occurs, for example a JPEG or 3 seconds of video before the trigger and 20 seconds after, etc.
any processing that the Node performs on the SceneData to extract information for the SceneMark.

Additional details of commands supported by this example standard are provided in Section B below.

The Data Pipeline is constructed by linking the inputs and outputs of Nodes. The specification for SceneMode objects include the following items:
Input(s): Each input has a configuration of the type of data that is expected to be received over the input, its encryption status, references to rights objects and the source URI for the source data to the input. Each input also has a unique Port ID.
Output(s): Each output has a configuration similar to that of the input port. Each output also has unique a Port ID.
Transducers(s): A Transducer is a either a sensor or an actuator. The output of the Transducer can be routed to one or more outputs, inputs (for an actuator), as well as to processing functions in the Node.
Process(es). The Process performs an analysis of the data that is generated by the Node or is routed from other Nodes. The data could be in the form of SceneMarks or SceneData from other Nodes. The Process performs the analysis and if a defined threshold is reached the Process will generate a trigger condition that results in a SceneMark and SceneData being generated according to the SceneMode configuration.

Figure 9:
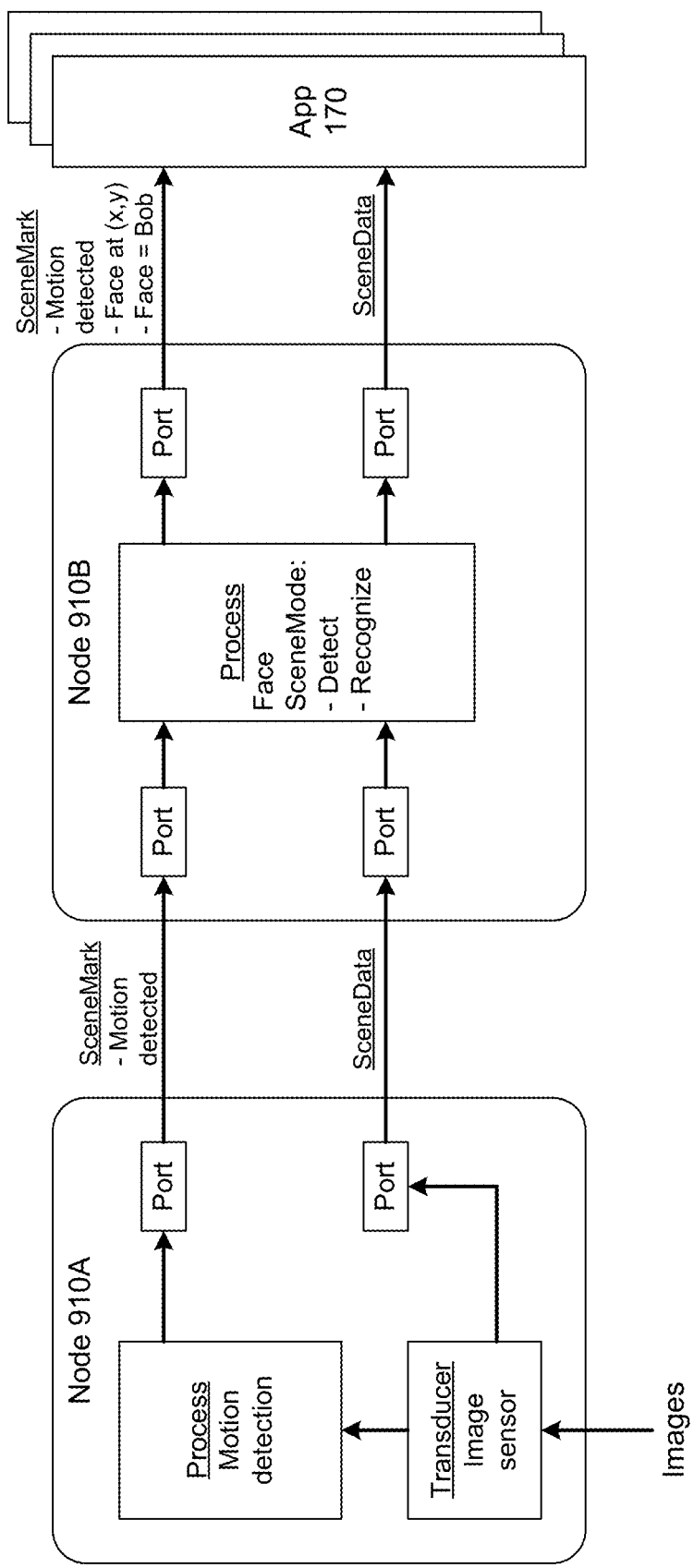
FIG. 9 is a block diagram of configured data pipeline.

FIG. 9 is a block diagram of a configured data pipeline. In this example, Node 910A contains an image sensor (Transducer capability) and motion detection (Process capability). The output SceneData is captured video. It is encoded according to the configuration of the Node's Output Port and is linked to an Input Port on Node 910B. The SceneData may be encoded as a video stream with a particular target bit rate and encoding mechanism. Node 910A also produces a SceneMark if motion is detected, with metadata indicating that motion was detected. The Process within Node 910B is set to the "Face" SceneMode, which also specifies the Node will perform the analysis levels of "Detect" and "Recognize" faces when motion is detected. This Process appends the resulting metadata to the SceneMark received from Node 910A and forwards the updated SceneMark to the requesting application 170. For example, the updated SceneMark may now include metadata that indicates the (x,y) coordinates of the detected face and the identity of the individual based on the face. The SceneData received on the Input Port is further processed to extract face information. For example, digital zoom and cropping may be applied. This SceneData may also be forwarded to the application 170.

The Data Pipeline is constructed by linking Nodes together. The SceneMode for a Node defines this configuration. The application constructing the Pipeline sets the SceneMode for each Node, taking care that a Node performs a Process and the required outputs from this process are forwarded to inputs of the subsequent Nodes in the Data Pipeline. The linkage is performed by defining a destination for either a Port or SceneMarks generated and defining the source for a Port or SceneMarks. Simultaneously defining the source and destination is compatible with the usage of protocols such as MQTT where a broker is an intermediary between two processes. The Source Node posts a message to the topic on the broker while the Sink Node subscribes to messages from the broker. For this type of connection, the Source Node has a destination for its messages while the Sink Node has a source for its incoming messages. This may vary according to the protocol being used.

A single device may have a single Node or have multiple Nodes. In case the device has multiple Nodes, the method for transferring SceneData and SceneMarks between the Nodes within the device may be proprietary to the device. In one approach, the configuration of the SceneMode for the Nodes within a device defines the source and destination for data within the device. The port configuration is used to configure the encoding of data when it is transferred between devices.

Some Processes within the Data Pipeline may feed back results to Processes earlier in the Data Pipeline. For example a Process which performs Face Detection may feed back to the sensor the region where the face has been detected. The sensor may use this information to adapt its capture settings to ensure the detected face is captured with the best clarity (focus, exposure, zoom, etc.).

Figure 10:
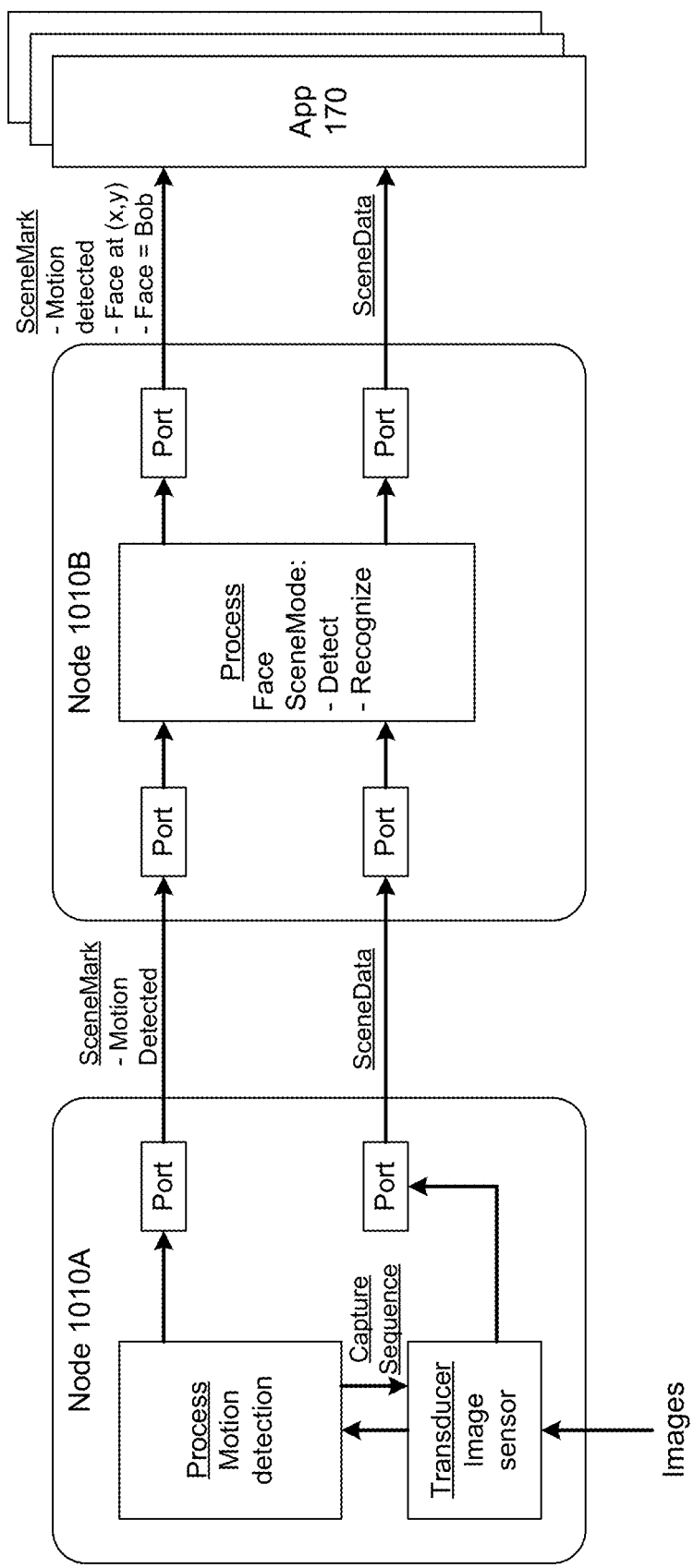
FIG. 10 is a block diagram of a data pipeline with feedback internal to a node.

FIG. 10 is a block diagram of a Data Pipeline with feedback internal to a Node. In this example, Node 1010A has the capability to detect motion. The SceneMode for this Node is set so that if motion is detected, a Capture Sequence is fed back to the sensor. A Capture Sequence defines the settings for a sequence of frames to be captured by the sensor. These settings may include the region where motion has been detected and guidance for the focus, exposure and zoom settings. A Capture Sequence may comprise one or more frames. The Capture Sequence is transferred internally within the Node but is defined as part of the SceneMode configuration for the Node.

Figure 11:
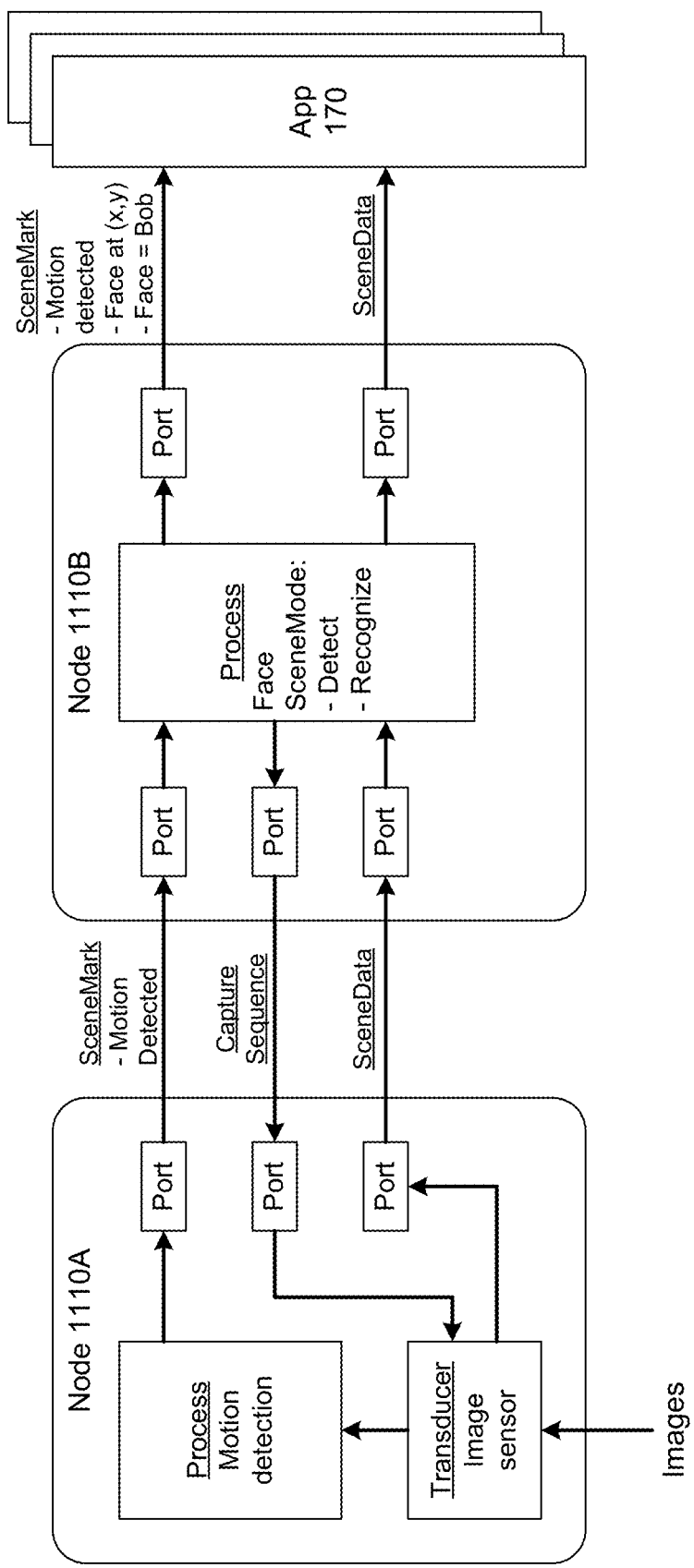
FIG. 11 is a block diagram of a data pipeline with feedback between nodes.

FIG. 11 is a block diagram of a Data Pipeline with feedback between Nodes. In this example, Node 1110B has its SceneMode set to Face and is configured to feed back to the Node 1110A the Capture Sequence for the sensor. In this example, the Process is set to detect faces and on detecting a face, the region of interest corresponding to the face is sent to the sensor to enable the sensor to optimize capture for the region where the face has been detected.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

Section A: Description of Data Objects

This Section A describes the following data objects:
Capabilities
SceneMode
SceneMark
SceneData Capabilities Object The Capabilities object defines Processing, Transducers and Ports that the Node is capable of providing. The Capabilities data structure describes the available processing, capture (input) and output of images, audio, sources of data and outputs of data that are supported by a Node. These include the following.

1. Transducer: A Transducer is either a sensor or an actuator which can convert data into a physical disturbance (for example a speaker). The following are examples of Transducers:
Image sensor (image, depth, or temperature camera) typically outputs a two-dimensional array that represents a frame.
Data sensor (humidity sensor, temperature sensor, etc.) typically outputs a text or data structure.
Audio microphone typically produces a continuous sequence of audio samples.
Speaker takes as an input a sequence of audio samples and outputs audio.

2. SceneModes supported: These are defined modes for analyzing images. See also the SceneMode object below.

3. Audio processing: This may be defined by the Node. It includes the function of speech to text.

4. CustomAnalysis: This allows the user to define custom analysis. As one example, it may be an algorithm that can process an audio, image or video input and generate a vector of scores whose meaning is defined by the algorithm.

5. Input: This may be SceneData or SceneMarks and may be in a processed or unprocessed form. The following may be sources for the process:
Output of a sensor internal or external to the device.
Output of a Node on a different device.
Output of a different Node within the same device.

6. Output: An output may be SceneData or SceneMarks and may also be in a processed or unprocessed form.

SceneMode Object

The SceneMode determines the data to be generated. It defines which type of data is to be prioritized by the capture of frames and the processing of the captured frames. It also defines the SceneMarks that are generated and the trigger conditions for generating the SceneMarks.

For example the Face SceneMode will prioritize the capture of faces within a sequence of frames. When a face is detected, the camera system will capture frames with the faces present where the face is correctly focused, illuminated and, where necessary, sufficiently zoomed to enable facial recognition to be executed with increased chance of success. When more than one face is detected, the camera may capture as many faces as possible correctly. The camera may use multiple frames with different settings optimized for the faces in view. For example, for faces close to the camera, the camera is focused close. For faces further away, digital zoom and longer focus is used.

The following SceneModes may be defined:
Face
Human
Animal
Text/Logo/Barcode
Vehicle
Object Label. This is a generalized labeling of images captured by the camera.
Custom. This is user defined.

The SceneMode may generate data fields in the SceneMark associated with other SceneModes. The purpose of the SceneMode is guide the capture of images to suit the mode and define a workflow for generating the data as defined by the SceneMode. At the application level, the application need not have insight into the specific configuration of the devices and how the devices are capturing images. The application uses the SceneMode to indicate which types of data the application is interested in and are of highest priority to the application.

Trigger Condition

A SceneMode typically will have one or more "Triggers." A Trigger is a condition upon which a SceneMark is generated and the SceneData defined for the SceneMode is captured and processed. The application can determine when a SceneMark should be generated.

In one approach, Triggers are based on a multi-level model of image understanding. The Analysis Levels are the following:

1. Motion Detected: The Process is capable of detecting motion within the field of view.
2. Item Detected or Item Disappeared: The Process is capable of detecting the item associated with the SceneMode (Item Detected) or detecting when the item is no longer present (Item Disappeared). For example in the case of SceneMode=Face, Item Detected means that a Face has been detected. In the case of SceneMode=Animal, Item Disappeared means a previously detected animal is no longer present.
3. Item Recognized: The Process is capable of identifying the detected item. For example in the case of the SceneMode=Label, "Recognized" means a detected item can be labelled. In the case of SceneMode=Face, "Recognized" means that the identity of the face can be determined. In one version, the SceneMode configuration supports recognition of objects based on reference images for the object.
4. Item Characterized: The Process is capable of determining a higher-level characteristic for the item. For example in Scene Mode=Face, "Characterized" means that some feature of the detected face has had an attribute associated with it. For example, a mood or emotion has been attributed to the detected face.

The SceneMode defines the Analysis Level required to trigger the generation of a SceneMark. For example, for SceneMode=Face, the Trigger Condition may be Face Detected, or Face Recognized, or Face Characterized for Emotion. Similar options are available for the other SceneModes listed above.

SceneMark Object

A SceneMark is a compact representation of a recognized Scene of interest based on image understanding of the time- and/or location-correlated aggregated events. SceneMarks may be used to extract and present information pertinent to consumers of the sensor data. SceneMarks may also be used to facilitate the intelligent and efficient archival/retrieval of detailed information, including the raw sensor data. In this role, SceneMarks operate as an index into a much larger volume of sensor data.

SceneMark objects include the following:
SceneMark identifier
Timestamp
Image understanding metadata
Reference to corresponding SceneData When the analysis engines encounter Trigger Conditions, a SceneMark is produced. It provides a reference to the SceneData and metadata for the Trigger Condition. The completeness of the SceneMark is determined by the analysis capabilities of the Node. If the Node can only perform motion detection when higher level analysis is ultimately desired, a partial SceneMark may be generated. The partial SceneMark may then be completed by subsequent processing Nodes.

SceneData Object

SceneData is captured or provided by a group of one or more sensor devices and/or sensor modules, which includes different types of sensor data related to the Scene. SceneData is not limited to the raw captured data, but may also include some further processing. Examples include:
RGB image data
IR image data
RGB IR image data
Depth map
Stereo image data
Audio
Temperature
Humidity
Carbon Monoxide
Passive Infrared The SceneMode defines the type and amount of SceneData that is generated when the Trigger that is associated with the SceneMode is triggered. For example the SceneMode configuration may indicate that 10 seconds of video before the Trigger and 30 seconds after the Trigger is generated as SceneData. This is set in the SceneData configuration field of the SceneMode data object. Multiple SceneMarks may reference a single video file of SceneData if Triggers happen more rapidly than the period defined for SceneData. For example where multiple Triggers occur within 30 seconds and the SceneData is defined for each Trigger is 30 seconds. Where multiple Triggers occur within those 30 seconds, the SceneMarks generated for each Trigger reference the same video file that makes up the SceneData for the Trigger.

Section B: Description of Commands

The following commands are supported for the Control Interface:

GetCapabilities. Used by Sink to obtain a list of capabilities for a specific Source Node.

SetSceneMode. Sink loads a SceneMode into the Source Node. A SceneMode becomes active when the SceneModeSchedule triggers the SceneMode or an explicit StartScene command is sent to the Node. The SceneMode becomes inactive either according to the Schedule or when a StopScene command is sent to the Node. The StartScene and StopScene commands override the Schedule.

SetCaptureSequence. This control class implementation is intended for use by Sink for controlling the capture settings of a Transducer Source Node used for image capture. The capture mode represents a sequence of captures of frames and the setting of each frame. For example, if a capture mode requires a high-resolution frame followed by 4 video frames, there will be two control classes sent to the sensor. The first will be sent before the still image is captured and will indicate that a full resolution frame should be captured with a specific exposure setting, with a specific focus setting, etc. The second class will be sent indicating that a video sequence should be captured, the number of frames in the sequence, digital zoom setting, etc.

StartScene. Sink starts a SceneMode. To stop this SceneMode an explicit StopScene command is issued. If the same SceneID appears in the SceneMarkSchedule, this command overrides the SceneMarkSchedule.

StopScene. Sink stops a running SceneMode. This may be used to stop a scheduled or a regularly triggered SceneMode. If a scheduled SceneMode is stopped using this command, the SceneMode will only be restarted if a StartSceneMode command is sent or the next scheduled time occurs.

SetSceneModeSchedule. Sink sets a SceneMode schedule for use in conjunction with preloaded SceneModes. Multiple SceneModes may be loaded into the Node. If this object is loaded into the Node, the SceneModeIDs that are listed in the object are performed according to the Schedule defined within the object.

The following commands are supported for the Data Interface:

GetSceneData. Sink request the SceneData file or manifest from a Source Node.

SetSceneData. Source Node publishes SceneData manifest containing at least one SceneData object or reference to at least one SceneData file. This structure may also be used to contain or reference a partial or complete set of historical SceneData. SceneData may also be encoded within this data object.

GetSceneMark. Sink requests a specific SceneMark from the Node which corresponds to a specific SceneMarkID.

SetSceneMark. Source writes a SceneMark which may be stored within a Node.

What is claimed is:

1. For a network comprising a plurality of configurable nodes, a method for organizing the nodes into a data pipeline for one or more applications that require image understanding, the method comprising:

receiving capabilities objects that contain descriptions of the capabilities of each of the nodes; wherein a syntax of the capabilities objects is defined by a standard and, in accordance with the standard, the capabilities object for a particular node defines any input ports and output ports for that particular node and also defines at least one of processing and transducers which that particular node is capable of providing;

based on the descriptions in the capabilities objects, selecting which nodes to include in the data pipeline and determining interconnections between the selected nodes to form the data pipeline, wherein the capabilities object for at least one of the selected nodes defines at least one sensor function used in the data pipeline and the capabilities object for at least another one of the selected nodes defines at least one image understanding function used in the data pipeline; and transmitting control data to the selected nodes in accordance with the standard, the control data specifying functions for the selected nodes according to each node's role in the data pipeline according to the processing and/or transducers defined in the corresponding capabilities object and also specifying the determined interconnections between the selected nodes according to the input and output ports defined in the corresponding capabilities objects;

wherein the data pipeline includes one or more nodes with access to sensor functions that operate as sources for the data pipeline, at least one of the sources captures images, the data pipeline produces image data and image understanding metadata from sensor data captured by the sources, the image data comprises captured images and/or enhanced images developed from the captured images, the image understanding metadata comprises metadata that describes image understanding of the image data and references the image data that corresponds to the image understanding, and the control data also specifies the image data and image understanding metadata produced by the data pipeline.

2. The method of claim 1 wherein the data pipeline performs image understanding that comprises detection of a prespecified object, detection of absence of a prespecified object, and/or identification of a prespecified object; and image understanding metadata describes said image understanding.

3. The method of claim 2 wherein the prespecified object includes at least one of faces, humans, animals, vehicles, texts, logos, or bar codes.

4. The method of claim 2 wherein the data pipeline performs image understanding that comprises a further understanding based on the detection or identification of the prespecified objects; and the image understanding metadata describes said image understanding.

5. The method of claim 1 wherein the data pipeline performs image understanding that comprises detection of prespecified actions or activities, identification of prespecified actions or activities, detection of prespecified locations or environments, and/or identification of prespecified locations or environments; and the image understanding metadata describes said image understanding.

6. The method of claim 1 wherein the data pipeline performs image understanding using machine learning, deep learning and/or artificial intelligence techniques; and the image understanding metadata describes said image understanding.

7. The method of claim 1 wherein the control data is based on a multi-level model of image understanding; and the multi-level model includes a motion detection level, an object detection level, an object identification level and an object characterization level.

8. The method of claim 7 wherein the descriptions of the capabilities specify which levels of the multi-level model can be implemented by each node and for which objects.

9. The method of claim 7 wherein the control data specifies which levels of the multi-level model are configured for the selected nodes and for which objects.

10. The method of claim 1 wherein the description of capabilities of the nodes includes description of image development functions of the nodes, the image development functions including at least one of: correction of sensor bias, correction of pixel defects, vignetting compensation, dark frame subtraction, white balancing, demosaicing, noise reduction, spatial filtering, color space conversion, tone mapping, gamma correction, contrast enhancement, edge enhancement, aberration correction, focus adjustment, exposure adjustment, resampling, resolution enhancement, high-dynamic range adjustment, and color filter array interpolation.

11. The method of claim 1 wherein:

the data pipeline includes different branches that include different sensor, image development and/or image understanding functions; the different branches triggered by conditions on the image understanding; and the control data also specify the conditions on the image understanding.

12. The method of claim 1 wherein the data pipeline includes a feedback loop from at least one image understanding function.

13. The method of claim 12 wherein the feedback loop is from the image understanding function to at least one image capture function.

14. The method of claim 12 wherein the image understanding function is implemented in one of the nodes, and the feedback loop is from the image understanding function to a function in a different node.

15. The method of claim 1 wherein the data pipeline has access to multiple sources that capture different types of sensor data, and the data pipeline fuses the sensor data for at least one image understanding function.

16. The method of claim 1 wherein selecting which nodes to include in the data pipeline and determining interconnections between the selected nodes to form the data pipeline is further based on a known proximity between sensors providing sensor data to the data pipeline.

17. The method of claim 1 wherein at least one application has access to an intermediary service that has access to the nodes.

18. The method of claim 1 wherein access to the nodes is a conditional access.

19. The method of claim 18 wherein the conditional access is authorized by a service separate from the applications and the nodes.

20. The method of claim 1 wherein the data pipeline accesses at least one node via the Internet.

* * * * *